(12) United States Patent
Alon

(10) Patent No.: US 9,460,556 B2
(45) Date of Patent: Oct. 4, 2016

(54) SYSTEM AND METHOD FOR INTERACTIVE MASKING AND MODIFYING OF 3D OBJECTS

(71) Applicant: PIXOLOGIC, INC., Los Angeles, CA (US)

(72) Inventor: Ofer Alon, Forest City, CA (US)

(73) Assignee: PIXOLOGIC, INC., Los Angeles, CA (US)

( * ) Notice: Subject to any disclaimer, the term of this patent is extended or adjusted under 35 U.S.C. 154(b) by 601 days.

(21) Appl. No.: 13/935,429

(22) Filed: Jul. 3, 2013

(65) Prior Publication Data

US 2014/0013282 A1 Jan. 9, 2014

Related U.S. Application Data

(63) Continuation of application No. 12/034,658, filed on Feb. 20, 2008, now abandoned.

(60) Provisional application No. 60/902,557, filed on Feb. 20, 2007.

(51) Int. Cl.
*G06T 17/10* (2006.01)
*G06T 19/20* (2011.01)

(52) U.S. Cl.
CPC ............... *G06T 17/10* (2013.01); *G06T 19/20* (2013.01); *G06T 2200/24* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| 6,597,363 B1 | 7/2003 | Duluk, Jr. et al. |
| 7,088,367 B2 | 8/2006 | Boyd et al. |
| 2006/0139314 A1 | 6/2006 | Bell |
| 2007/0109305 A1 | 5/2007 | Tak et al. |

OTHER PUBLICATIONS

Singh, K., Fiume, E., Wires: A Geometric Deformation Technique, Jul. 1998, Proceedings of the 25th annual conference on Computer graphics and interactive techniques, pp. 405-414.*
Singh, K., Fiume, E., Wires: A Geometric Deformation Technique, Jul. 1998, Proceedings of the 25th Annual Conference on Computer Graphics and Interactive Techniques, pp. 405-414.
International Search Report and Written Opinion for PCT/US08/54482, dated Jul. 30, 2008, 7 pgs.

* cited by examiner

*Primary Examiner* — Said Broome
(74) *Attorney, Agent, or Firm* — Lewis Roca Rothgerber Christie LLP

(57) ABSTRACT

A system and method for providing an intuitive and efficient mechanism to select areas of interest on a 3D model, and modify a pose or shape of the 3D model. A masking module allows an artist to interactively mask portions of a 3D object and leave other portions of the object unmasked. A posing module provides various tools to allow the artist to apply a posing or reshaping action on the unmasked areas of the 3D object. The computer artist masks portions of the 3D object by clicking and dragging the user input device on an area of the 3D object. All vertices whose topological distances are closer to the vertex associated with the initial click position than the final dragged position are masked. The artist then draws an action line on or partially on the 3D object to define a coordinate system. The artist clicks on a point on the action line, and drags the user input device for corresponding transformations of the unmasked portions of the 3D object.

8 Claims, 14 Drawing Sheets

SYSTEM AND METHOD FOR INTERACTIVE MASKING AND MODIFYING OF 3D OBJECTS

CROSS-REFERENCE TO RELATED APPLICATION(S)

This application is a continuation of U.S. application Ser. No. 12/034,658 filed Feb. 20, 2008, which claims the benefit of U.S. Provisional Application No. 60/902,557, filed on Feb. 20, 2007, the content of both of which are incorporated herein by reference.

FIELD OF THE INVENTION

This invention relates to systems and methods for modifying the shape or pose of a 3D object, and more specifically, to a system and method for interactively modifying the shape or pose via improved posing tools and masking interface.

BACKGROUND OF THE INVENTION

In the field of 3D computer graphics, 3D modeling is used to modify the shape or pose of geometry meshes. Geometry meshes typically contain vertices with coordinates in 3D space (x,y,z) along the Cartesian axis, that are connected to form a continuous surface of faces whose edges link these vertices together. These faces are typically triangles connecting three vertices, or quadrilaterals connecting four vertices. Geometry meshes are used to represent the visual shape of 3D objects such as human characters, cars, and buildings, on a computer. One part of modeling a 3D object is to articulate its geometry mesh to give a particularly dramatic pose or characteristic look to the object.

Using a traditional 3D modeling tool to pose a 3D object generally requires the creation of a virtual skeleton by a computer artist and the rigging, or binding, of the geometry mesh to the virtual skeleton. A virtual skeleton is a connected set of bones, and binding the mesh to the skeleton associates each vertex of the geometry mesh to one or more bones on the mesh. A weight is also assigned to each vertex-to-bone association for allowing movement of skin near the joints of two bones to be influenced by both bones based on the assigned weight. The binding of the geometry mesh to virtual bones is also referred to as skinning the mesh. After skinning of the mesh, the user can pose or animate the geometry mesh so that it appears to be walking, for example, or move the bones to produce a dramatic pose for a poster or web image. The posing via a virtual skeleton allows posing to be defined by posing the bones, instead of vertex-by-vertex posing.

Skeletal animation or posing generally requires computer artists to be skilled at constructing virtual skeletons and binding geometry meshes to them. This ability requires significant training. In addition, the binding process generally requires many iterations of the artist painting weights on the geometry mesh for each bone, and previewing the results, in order to get a mesh binding that moves naturally as the virtual skeleton is moved to produce a pose. Even if the artist is producing sample work and wants to quickly pose the mesh, the artist nonetheless goes through this tedious process of assigning weights or manually moving the vertices of the mesh. The tediousness is exacerbated by high polygon counts in a typical geometry mesh used to produce high quality work, and correspondingly high vertex counts.

The prior art aims to facilitate the selection of a portion of a 3D object that is to be posed via different selection tools. Exemplary selection tools include virtual brushes, lassos, or rectangular selection boxes. For example, if the artist wants to pose the arm of a 3D object via lasso selection, he or she carefully manipulates the lasso selection tool to place a lasso on the entire arm that is to be posed. However, if a portion of the arm to be posed is hidden behind another object, such as, for example, inside a pocket, placing the lasso around the hand would generally require the artist to zoom in or otherwise maneuver the available views to ensure that the lasso is wrapped around the arm and not any other intervening objects.

Accordingly, what is desired is a more efficient and intuitive system and method for posing and reshaping a geometry mesh.

SUMMARY OF THE INVENTION

According to one embodiment, the present invention is directed to a computer-implemented method for interactively modifying the shape or pose of a 3D object. The method includes displaying the 3D object on a display; drawing on the display an action line in response to a user command; receiving a user selection of an action to be applied to the 3D object; receiving a user selection of a point associated with the action line; detecting movement of a user input device with respect to the selected point; and applying the selected action on at least a portion of the 3D object based on the detected movement of the user input device and with reference to the action line.

According to one embodiment of the invention, at least a first portion of the 3D object is masked in response to a first user command and at least a second portion of the 3D object is left unmasked. The selected action is then applied to the unmasked portion of the 3D object.

According to one embodiment of the invention, the action line has a start point and an end point, the selected action is a rotate action, the selected point is the end point, and the applying the selected action is rotating at least the portion of the 3D object about the start point.

According to one embodiment of the invention, the selected action is a rotate action, and the applying the selected action is rotating the 3D object about an axis defined by the action line.

According to one embodiment, the action line has a start point and an end point, the selected action is a scaling action, the selected point is the start point, the movement of the user input device is dragging the user input device away from the end point, and the applying the selected action is scaling up of at least the portion of the 3D object.

According to one embodiment, the action line has a start point and an end point, the selected action is a scaling action, the selected point is the start point, the movement of the user input device is dragging the user input device towards the end point, and the applying the selected action is scaling down at least the portion of the 3D object.

According to one embodiment of the invention, the action is a move action, and the applying the selected action is moving at least the portion of the 3D object about an axis defined by the action line.

According to one embodiment, the present invention is directed to a computer-implemented method for selecting a portion of a 3D object for modifying the 3D object. The 3D object is associated with a geometric mesh formed via a plurality of polygons having edges and associated plurality of vertices. The method includes identifying a first vertex on the geometric mesh; identifying a second vertex on the geometric mesh; for each current vertex of the plurality of vertices, determining a first topological distance in a first path from the current vertex to the first vertex, and a second topological distance in a second path from the current vertex to the second vertex; comparing the first topological distance with the second topological distance; and masking at least a first portion of the 3D object leaving at least a second portion of the 3D object unmasked based on the comparison.

This topology-based masking allows an artist to quickly mask off parts of the 3D model by clicking on the model and dragging the cursor to different areas of the model that the artist would like to work on. This allows the automatic identification of areas that the artist is likely to work on. The areas that may be found include the entire upper body, lower body, each leg and arm, lower leg, forearm, hand, individual fingers, head and neck, just the head area, edge-looped areas such as the mouth and eyes, the lower lip, upper lip, and others.

According to one embodiment of the invention, the first topological distance is a first number of intersections in the first path, and the second topological distance is a second number of intersections in the second path.

According to one embodiment of the invention, the first path traverses one or more of the edges of the plurality of polygons coupled between the current vertex and the first vertex.

According to one embodiment of the invention, each one of the intersections is a vertex shared by two or more of the plurality of polygons.

According to one embodiment of the invention, the first vertex is associated with a first point of the 3D object selected by a user, and the second vertex is associated with a second point of the 3D object.

According to one embodiment of the invention, a masking value is assigned to the current vertex based on the comparison. The vertex is masked if a first masking value is assigned, and the vertex is unmasked if a second masking value is assigned. The first masking value may be assigned to the vertex if the first topological distance is less than the second topological distance.

According to one embodiment of the invention, the vertex that is identified as being masked is not affected by a modification of the 3D object.

According to one embodiment of the invention, an updated masking value is calculated for each current vertex of the plurality of vertices based on an average of masking values of vertices surrounding the current vertex.

According to one embodiment of the invention, modification of the current vertex is scaled based on the assigned masking value.

Thus, a person of skill in the art should appreciate that the invention according to the above embodiments allows the posing or reshaping of a geometry mesh in an intuitive and efficient manner. The improved posing tools and masking interface allow an artist to quickly mask a geometry mesh, and subsequently interactively modify its pose or shape. These modifications do not require the tedious process of binding the geometry mesh to a virtual skeleton in order to reshape or pose it. Furthermore, the masking and reshaping according to the various embodiments of the present invention allow the artist to quickly achieve a dramatic pose even for high-vertex count geometry meshes.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION OF THE INVENTION

Figure 1:
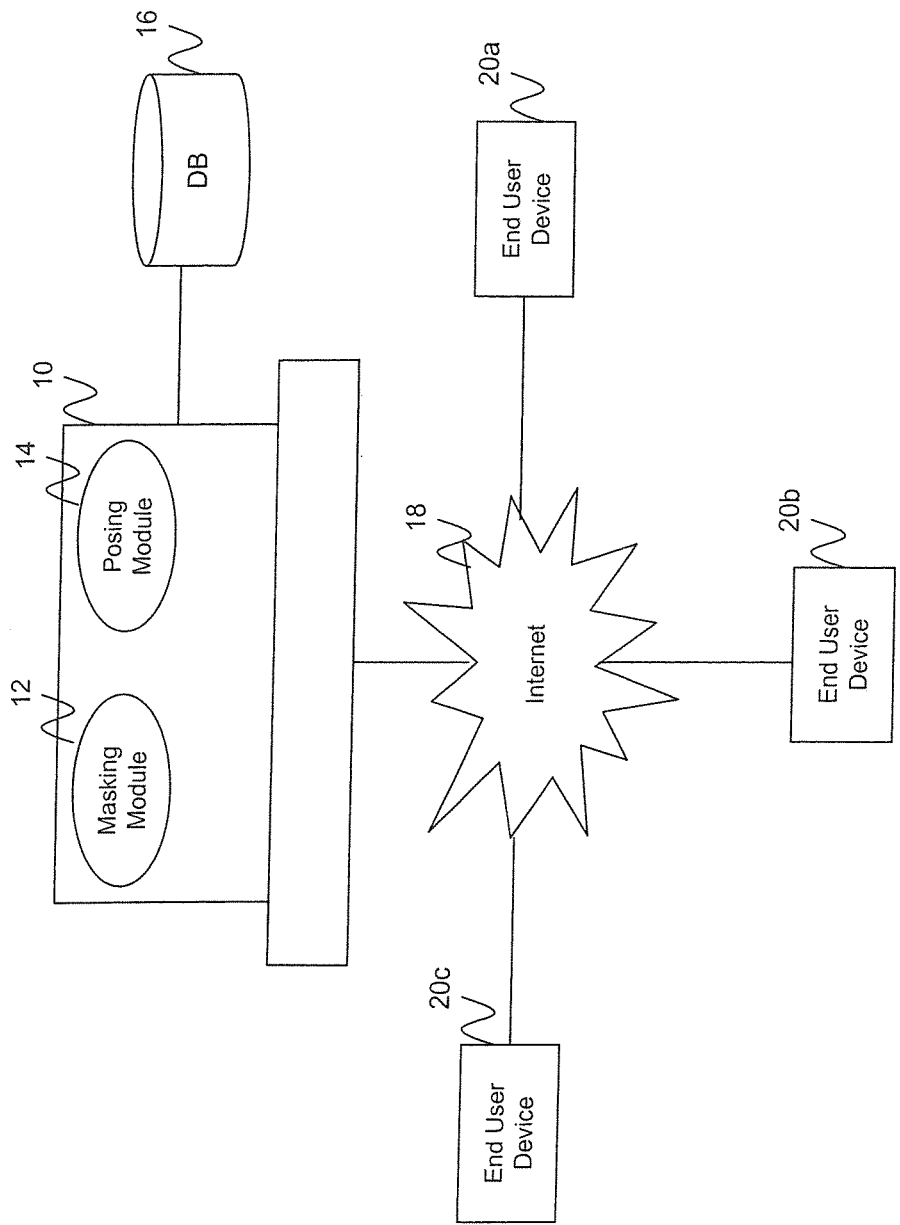
FIG. 1 is a schematic block diagram of a system for interactively masking and posing a 3D object according to one embodiment of the invention.

FIG. 1 is a schematic block diagram of a system for interactively masking and modifying a shape, pose, or position (generally referred to as pose) of a 3D object according to one embodiment of the invention. The illustrated system includes a server 10 coupled to various end user devices 20a-20c (collectively referred to as 20) over a data communications network 18 such as, for example, a public Internet. The server 10 includes one or more software modules for interactively masking and modifying the pose of the 3D object. Such software modules may include a masking module 12 and a posing module 14. The masking module provides a masking interface and associated logic to allow an artist to interactively mask portions of a 3D object and leave other portions of the object unmasked. According to one embodiment, the masked portions are not affected by a reshaping action taken by the artist.

The posing module 14 provides various reshaping tools and associated logic to allow the artist to modify a shape, position, or position of the unmasked areas of the 3D object. A person of skill in the art should recognize that the functionality of one or more of the modules may be combined into a single module, or the functionality of one or more of the modules further separated into additional modules or sub-modules. A person of skill in the art should also recognize that the modules may be implemented via software, or any combination of software, firmware, and/or hardware. Furthermore, although the tools are referred to as reshaping tools, a person of skill in the art should recognize that the term reshaping is used to generally refer to modification or some transformation or translation of the geometric mesh associated with the 3D objects.

The server 10 is coupled to a mass storage device 16 such as, for example, a disk drive or drive array, for storing information used by the server 10 for masking and posing a 3D object. For example, the mass storage device may store the geometric mesh of different 3D objects created by a computer artist.

According to one embodiment of the invention, the end user devices 20 may connect to the data communications network 18 using a telephone connection, satellite connection, cable connection, radio frequency communication, or any wired or wireless data communication mechanism known in the art. The users of the end user devices 20 may connect to the server 10 for downloading the masking module 12 and posing module 14 from the server, or for executing these modules remotely from the end user devices. If downloaded to the end user devices 20, the masking and posing modules 12, 14 may be provided as a single downloadable file. Once downloaded, the masking and posing modules 12, 14 may be executed locally by one or more processors resident in the downloading end user device. The information stored in the server's mass storage device 16 will also instead be stored locally in a data store coupled to the downloading end user device. According to another embodiment, the masking and posing modules 12, 14 are provided in a computer readable media and delivered to a user of the end user device for installation. According to another embodiment, the masking and posing modules are included as part for a 3D sculpturing tool such as, for example, ZBrush, marketed by Pixologic, Inc. of Los Angeles, Calif.

Regardless of whether the masking module 12 or posing module 14 is executed by the server 10 or locally by the end user devices 20, the modules provide an intuitive and efficient mechanism to select areas of interest on a 3D model, and move, scale, or rotate those areas to quickly achieve realistic poses of the model.

Figure 2:
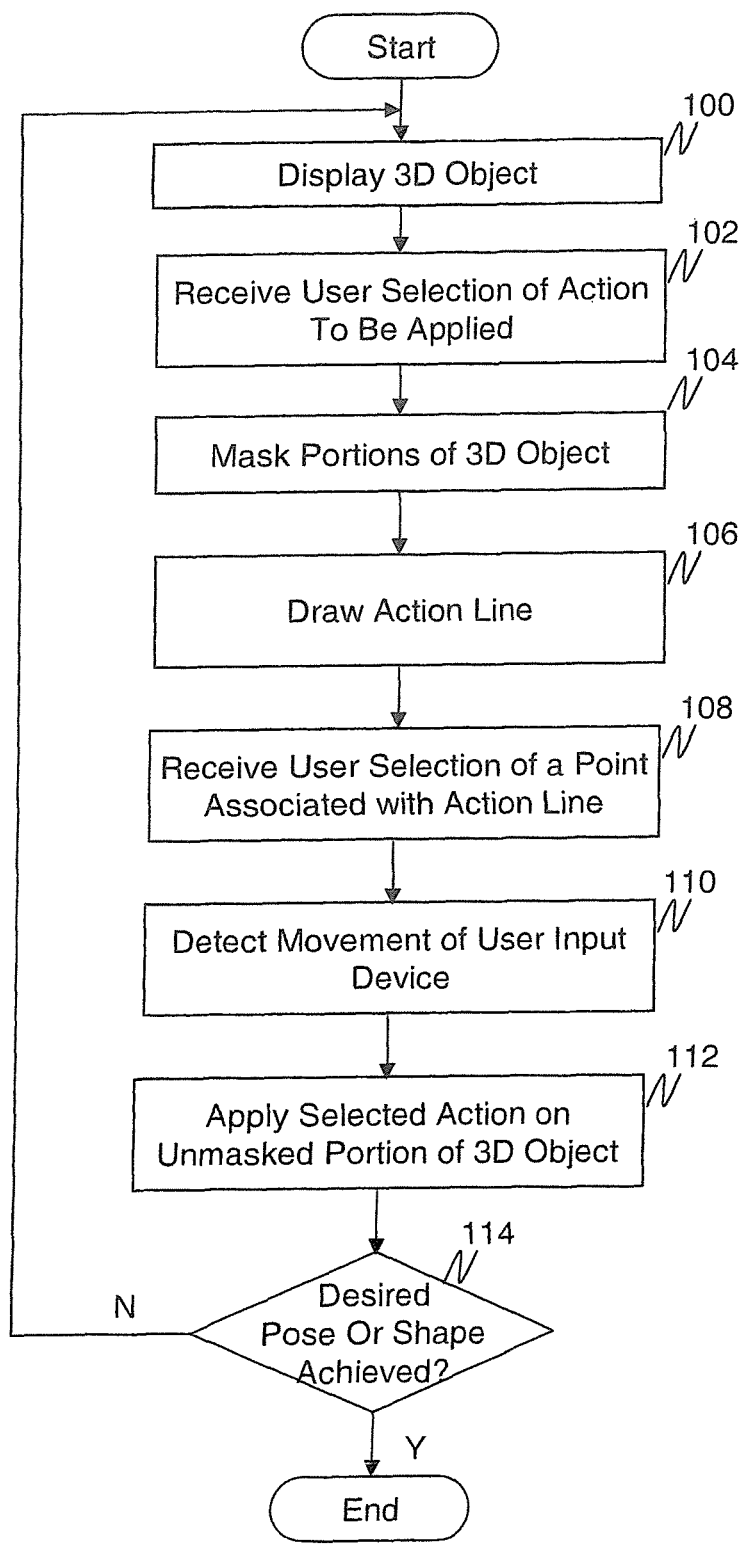
FIG. 2 flow diagram of a process for masking and posing a 3D object according to one embodiment of the invention.

FIG. 2 flow diagram of a process for masking and modifying the pose or shape of a 3D object via the masking and posing modules 12, 14 according to one embodiment of the invention. According to this embodiment, the modules are implemented as computer program instructions stored in the memory of the server 10 or end user device 20, which are then executed by a processor in the server or end user device.

The process starts, and in step 100, either the masking module 12 or posing module 14 displays a selected 3D object on a display device in response to a command by the computer artist. In step 102, the posing module 14 receives a user selection of a reshaping action to be applied to the displayed 3D object. In this regard, the posing module 14 provides various reshaping tools that may be activated by the computer artist. For example, selection of a "move" button activates a "move" reshaping tool for moving the 3D object from one position to another. Selection of a "rotate" button activates a "rotate" reshaping tool for rotating the 3D object on the display device. Selection of a "scale" button activates a "scale" reshaping tool for scaling the dimension of the 3D object on the display device. There may of course other types of reshaping tools as will be apparent to a person of skill in the art. Furthermore, other mechanisms besides interface buttons may be provided for selecting the tools, such as, for example, different keystroke combinations. Hence, the described embodiments are not limited to the specifically mentioned reshape tools nor their manner of being invoked.

Selection of a specific reshape tool places the geometry mesh associated with the displayed 3D object in a reshaping mode. Once in this mode, the masking module 12 provides a masking interface that allows the computer artist to efficiently mask parts of the mesh that are not to be affected by the selected reshape action. In this regard, in step 104, the masking module 12 masks portions of the 3D object in response to user actuation of a user input device (e.g. a mouse). For example, clicking and dragging the user input device in a first mode (e.g. while having a control key actuated) is an indication to the masking module 12 that portions of the 3D object associated with the initial clicked position and end dragged position are to be masked. As the user drags the user input device on the 3D object, the masking module 12 invokes a rendering algorithm for interactively illustrating the updated mask on the geometry mesh. For example, the parts of the mesh that are masked may be rendered with a darker color than the parts of the mesh that are unmasked.

Figure 3A:
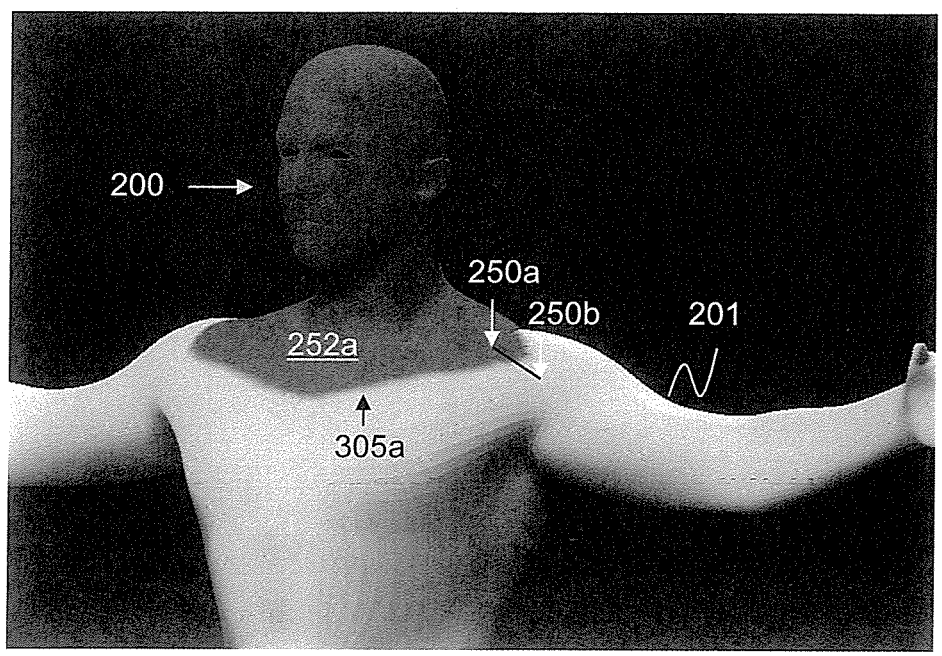
FIGS. 3A-3B are photographic images that depict the interactive masking of a 3D object according to one embodiment of the invention.
Figure 3B:
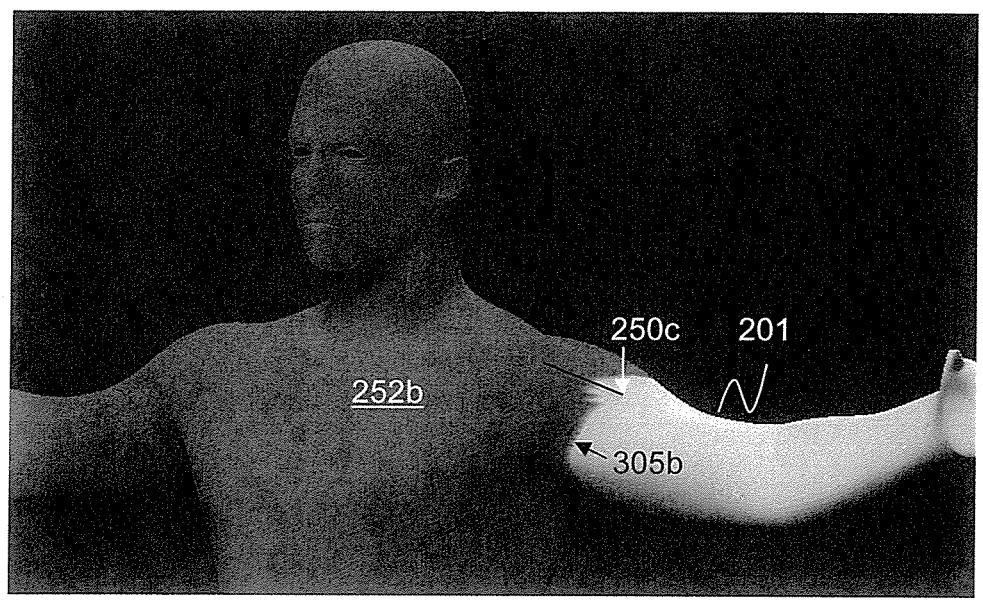

FIGS. 3A-3B depict the interactive masking of a 3D object 200 according to one embodiment of the invention. According to the illustrated example, if the artist desires to mask all areas of the 3D object except for the object's arm 201, the artist clicks on a start position 250a of the 3D object near the arm's shoulder joint, and drags the user input device on the mesh down the object's arm 201 to a current drag position 250b. During this process, the masking module 12 updates the 3D object by darkening the color of the masked parts 252a. As the artist continues to drag the user input device to a new dragged position 250c (FIG. 3B), the masked areas are updated and shown as updated darkened parts 252b. The mask boundary 305a, 305b and the darkened parts 252a, 252b give feedback to the artist of the current masked vertices to allow the artist to visually determine whether he or she is satisfied with the masking.

The computer artist drags the user input device until the desired portions of the 3D object have been masked, at which point the user input device is released. The artist may also start a fresh mask by clicking on a new area of the 3D object, causing a previous mask to be automatically cleared at the first click. Thus, a person of skill in the art will appreciate that masking may efficiently be done without resorting to prior art selection mechanisms such as brush-selections, lassos, or the like. Alternatively, prior art selection mechanisms may be utilized in addition to the described masking mechanism to fine tune and/or compliment the masking according to the present embodiments.

Referring again to FIG. 2, the posing module 14 is invoked in steps 106-112 to pose or reshape the unmasked parts of the mesh. Unlike the prior art, posing via the posing module 14 does not require the artist to generate a virtual skeleton of the 3D object nor bind the mesh to the virtual skeleton. Instead, in step 106, the posing module 14 draws an action line on or partially on the 3D object, in response to user manipulation of the user input device. For example, clicking on the 3D object with the user input device in a second mode (e.g. without the control key actuated), and dragging the user input device to a new position indicates to the posing module 14 that an action line is to be drawn. The posing module 14 draws the action line from a start position associated with the initial click of the user input device and an end position to which the user input device is dragged.

According to one embodiment of the invention, the action line defines an arbitrary axis relative to which a reshaping action is to occur. Depending on the particular reshaping tool that is selected, either the initial point of the action line or the ending point of the action line may be deemed to be the origin of the axis. Movement of the vertices of the mesh then occur relative to the defined axis. The action line may be thought as being akin to a virtual bone on a virtual skeleton. However, unlike prior art virtual skeletons, the action line may be dynamically placed on the 3D object without requiring any rigging of the mesh. Furthermore, the action line may only be placed on the portion of the 3D object to be posed.

Figure 4A:
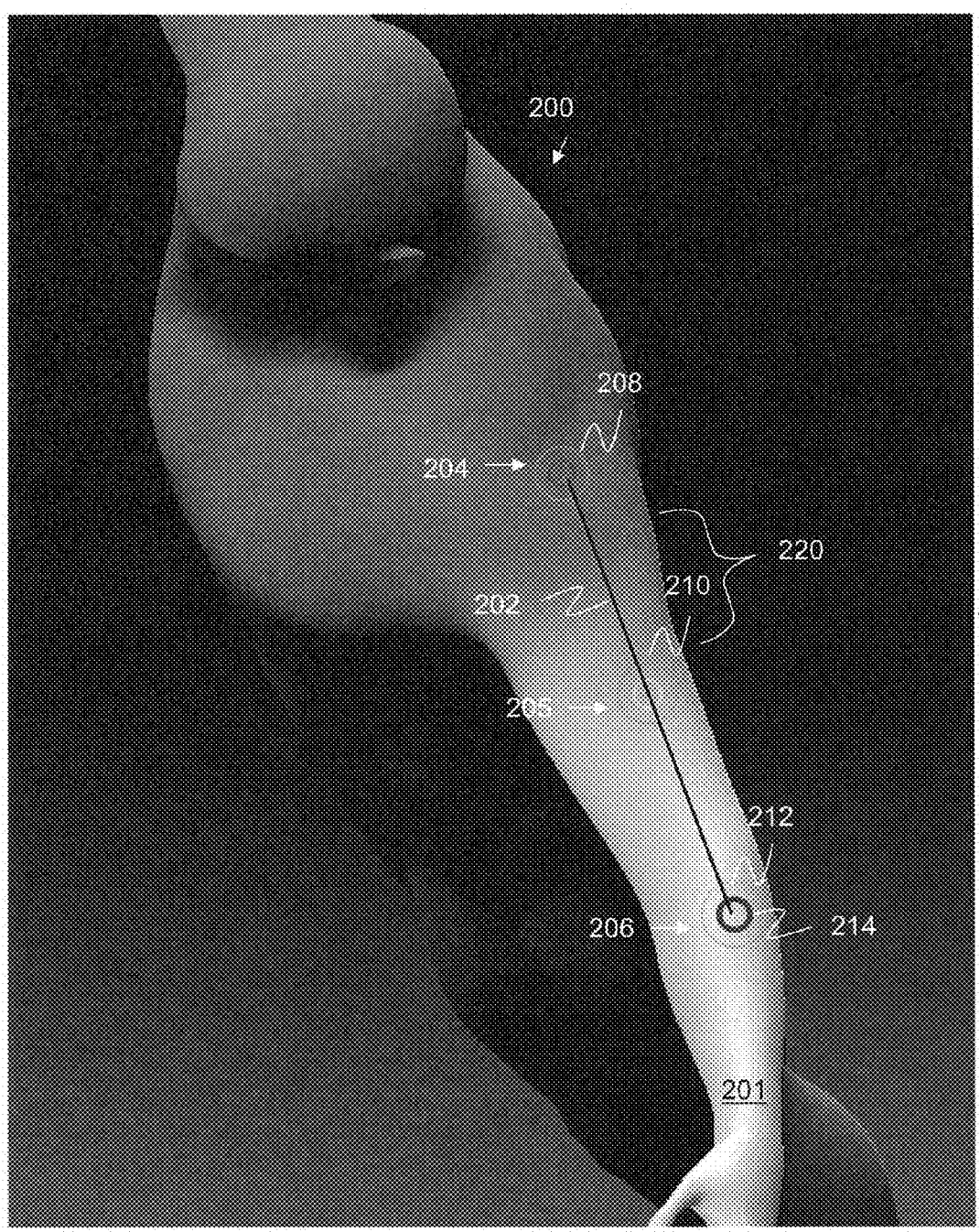
FIG. 4A is a photographic image that depicts an action line drawn on an unmasked arm of a 3D object according to one embodiment of the invention.

FIG. 4A depicts an action line drawn on the unmasked arm 201 of the 3D object 200 of FIGS. 3A-3B according to one embodiment of the invention. The depicted action line 202 has a start point 204 with an associated outer ring 208, a middle point 205 with an associated outer ring 210, and an end point 206 with an associated outer ring 212. The artist may more accurately position the action line by clicking and dragging on the outer rings 208, 210, 212. For example, clicking and dragging on ring 210 associated with the middle point 205 translates the tool on the screen. Clicking and dragging on the outer ring 208 of the start point 204 or outer ring 212 of the end point 206 allows the artist to move the associated endpoint of the action line to increase or decrease in length. Depending on the reshape operation to be performed, the artist positions the action line differently.

Once the action line has been placed, the artist clicks on a point on the action line, and drags the user input device for corresponding transformations of the unmasked portions of the 3D object. In this regard, in step 108 the posing module 14 receives a user selection of a point associated with the action line. In step 110, the posing module 14 detects movement of the user input device with respect to the selected point, and in step 112, the posing model applies the selected reshaping action on the unmasked portion of the 3D object based on the detected movement. The specific formulas for moving, scaling, or rotating vertices of a geometry mesh for the reshaping with respect to the action line should be well understood by those of skill in the art. Thus, once the arbitrary action line is drawn to specify the coordinate system, and once the origin of this coordinate system is set, the moving, scaling, or rotating actions may be applied using the well known formulas.

Figure 4B:
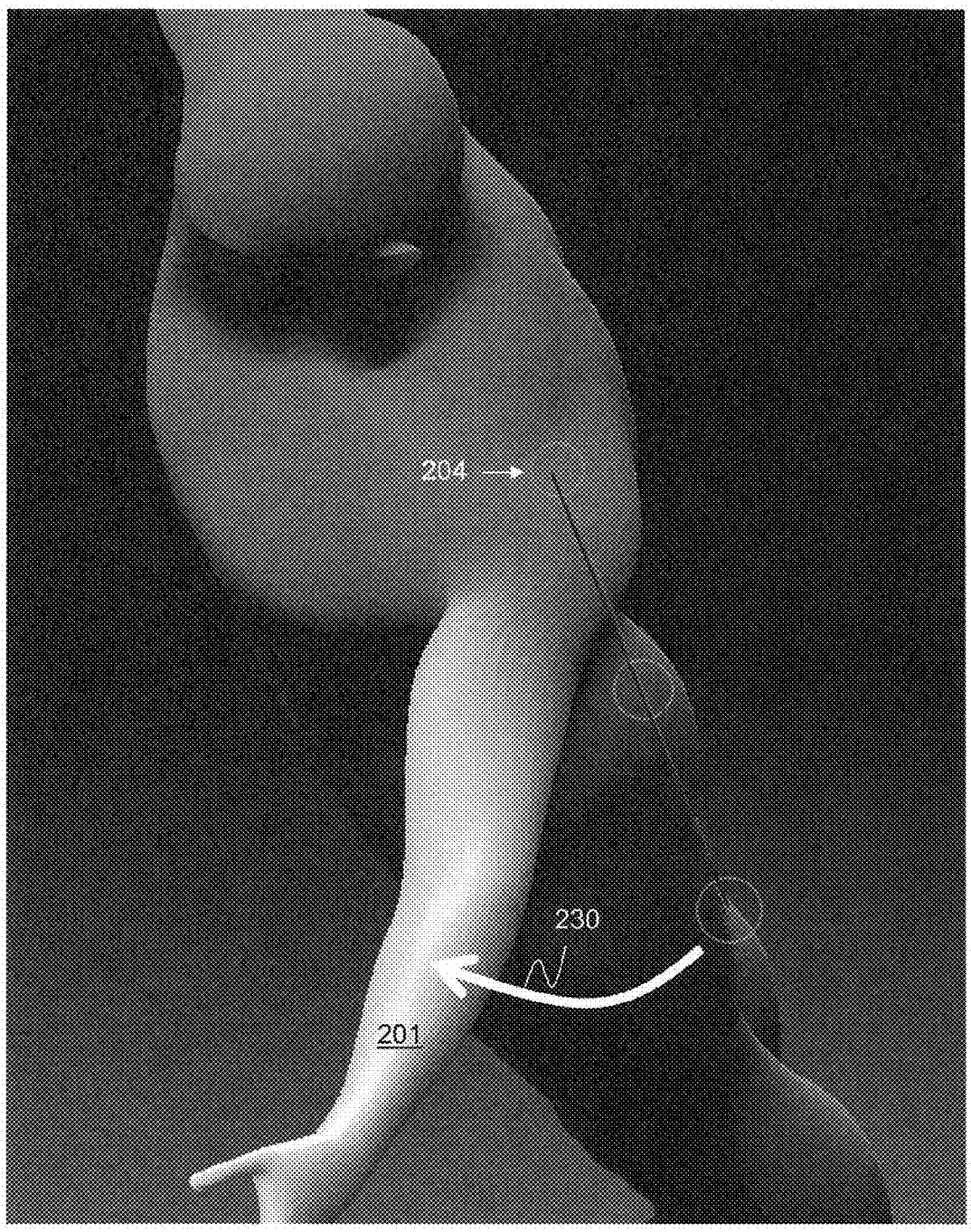
FIG. 4B is a photographic image that depicts the arm of FIG. 4A after a rotation action according to one embodiment of the invention.

According to one embodiment, it is assumed that the artist desires to rotate the unmasked arm 201 forward with respect to rest of the 3D object. After selecting a rotate tool and positioning the action line so that the start point 204 is over the virtual shoulder joint of the human figure and the end point 206 is positioned on the forearm, the artist clicks on inner ring 214 on the forearm, and drags the mouse in direction 230 as shown in FIG. 4B. Clicking on the action line indicates to the posing module 14 that the movement of the user input device is to be translated to the deformation of the unmasked vertices of the 3D object. Furthermore, clicking on one endpoint of the action line for a rotate action automatically sets the opposite endpoint as the origin. In the illustrated example, as the user drags the mouse along direction 230 (FIG. 4B) after clicking on point 214, the unmasked arm 201 is interactively rotated about the start point 204 on a 3D-axis perpendicular to the computer screen. The same action line may be use to perform different deformations, or a new mask and/or action line defined for those deformations.

In step 114, a determination is made as to whether a desired pose or shape has been achieved. If the answer is YES, the process ends.

Figure 5:
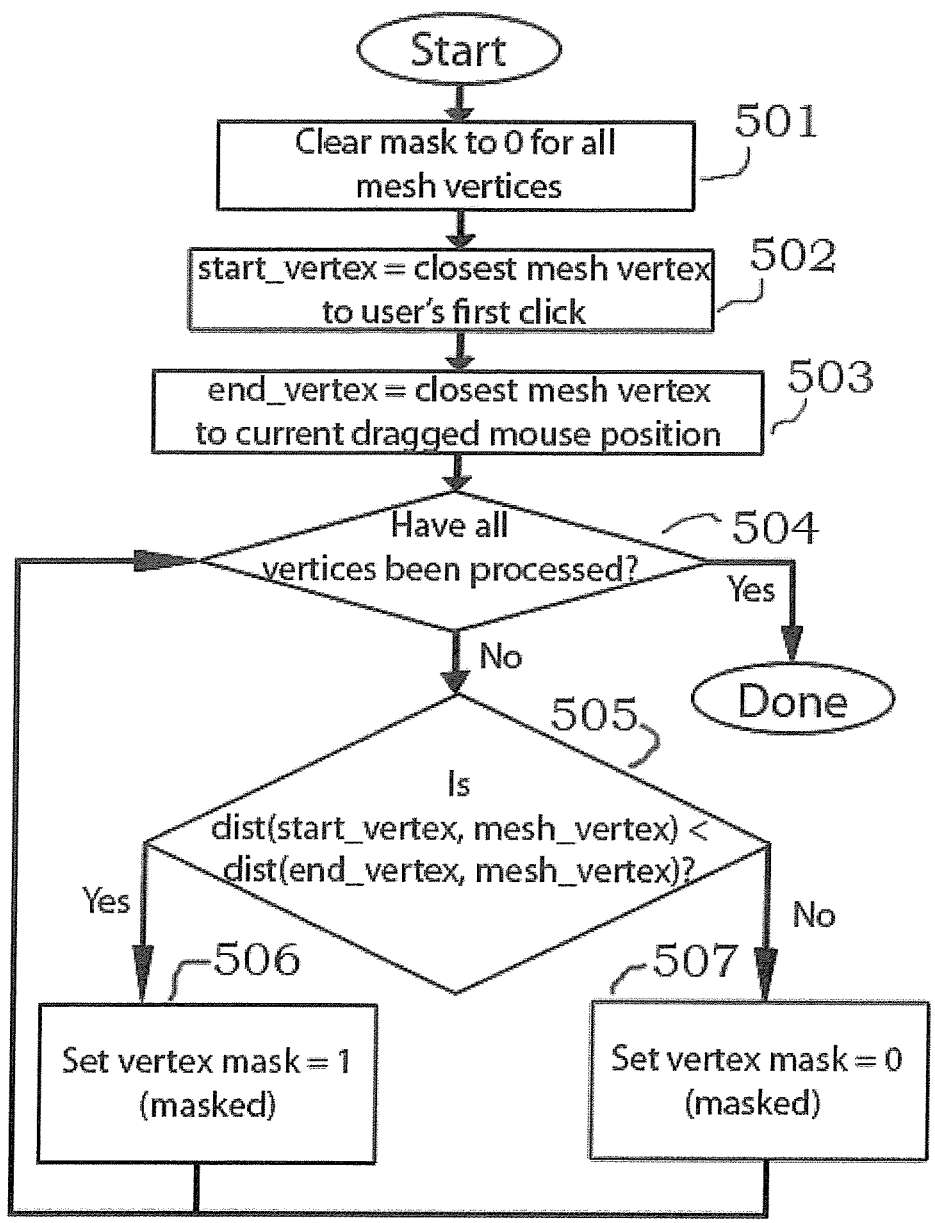
FIG. 5 is a flow diagram of a process for masking portions of a 3D object according to one embodiment of the invention.

FIG. 5 is a flow diagram of a process for masking portions of a 3D object according to one embodiment of the invention. The process starts, and in step 501, the masking module clears the masking values of all vertices of the mesh to 0. In step 502, the masking module locates a mesh vertex closest to the initial user click (start_vertex), and in step 503, locates the mesh vertex closest to the current mouse drag position (end_vertex).

The masking module then processes all vertices of the mesh by determining, in step 504, whether a topological distance from a current vertex to the start_vertex is less than the topological distance to the end_vertex. If the answer is YES, then the mask value for the current vertex is set to 1 in step 506, indicating that the vertex is masked. If the answer is NO, then the mask value for the current vertex is set to 0 in step 507, indicating that the vertex is not masked.

According to one embodiment of the invention, a topological distance between vertex A and vertex B does not measure a physical, metric distance between those two points, but rather, measures a number of intersections in a shortest path from vertex A to vertex B. According to one embodiment of the invention, an intersection is a vertex shared by two or more polygons. The masking module traverses the edges of polygons coupled between vertex A and vertex B to determine the number of intersections in the shortest path from vertex A to vertex B.

Two vertices which may be close to one another based on a physical measurement may in fact be far apart when considering the topological distance. For example, consider the situation where the arm of the 3D object lies against the object's chest. The masking of the arm according to the algorithm of FIG. 5 where the start_vertex is near a shoulder joint and the user drags the user input device down the arm towards the forearm allows the artist to select the atm while masking the remaining portions of the 3D object, including the object's chest. This is because although vertex on the chest may be closer in physical distance to a current drag position than to the start_vertex, the number of intersections that are crossed is greater because the path from a vertex on the chest to the current drag position on the object's arm goes through the object's shoulder joint where the start_vertex is located.

Figure 6:
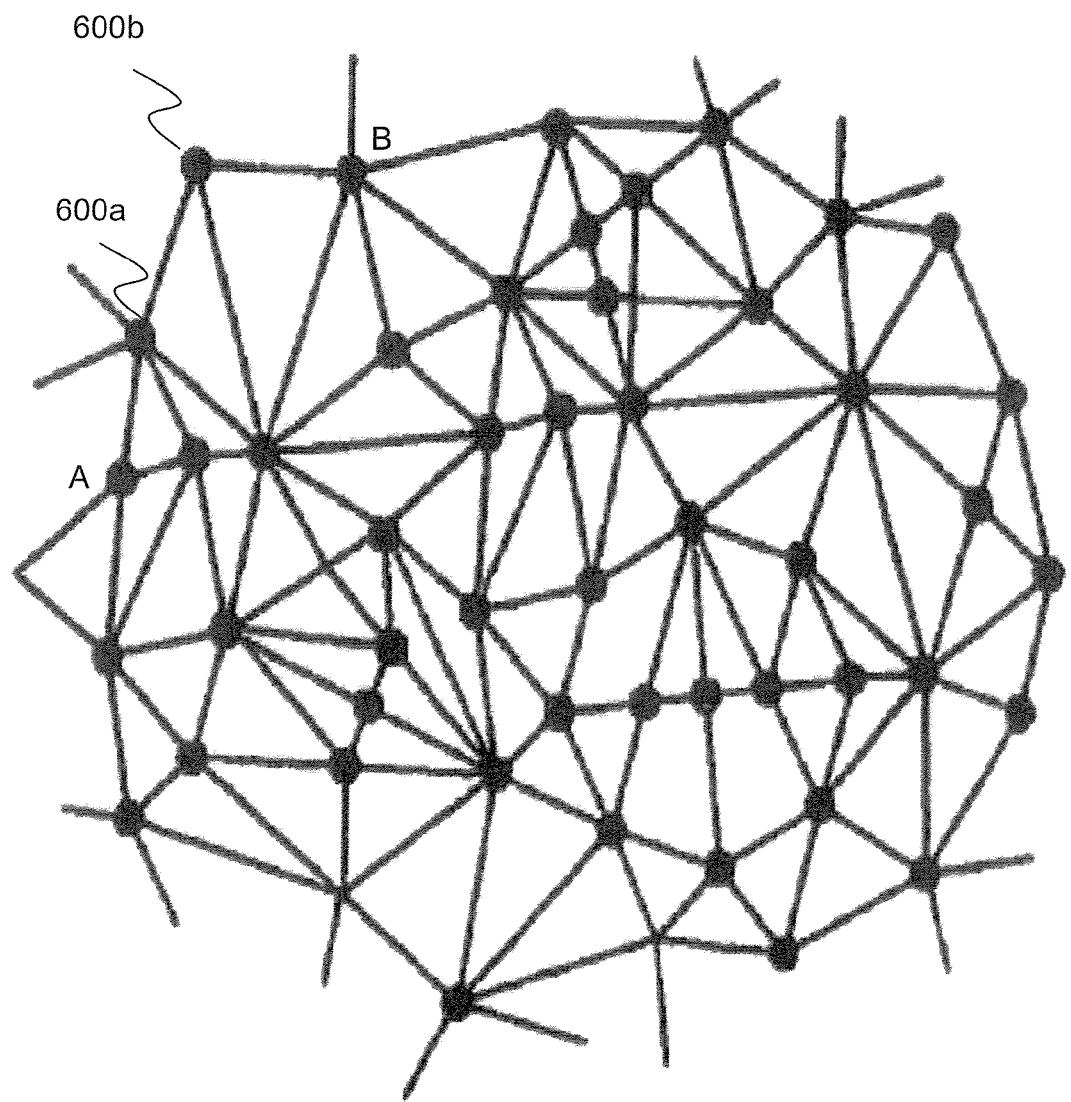
FIG. 6 is a diagram of an exemplary mesh depicting a topological distance between vertex A and vertex B according to one embodiment of the invention.

An exemplary calculation of a topological distance is provided with respect to FIG. 6. FIG. 6 illustrates an exemplary mesh with vertex A and vertex B. One of the shortest paths from vertex A and vertex B crosses intersections 600a and 600b. Accordingly, the intersection distance from vertex A to vertex B is 2.

According to one embodiment of the invention, after the masking module 12 designates each vertex of the mesh as being masked by assigning a masking value of 1 or unmasked by assigning a masking value of 0, the masking module proceeds to calculate an average value for each vertex based on the masking values assigned to the surrounding vertices. As a result, vertices on the border between a masked area and an unmasked area receive a masking value that is between 0 and 1.

Figure 7A:
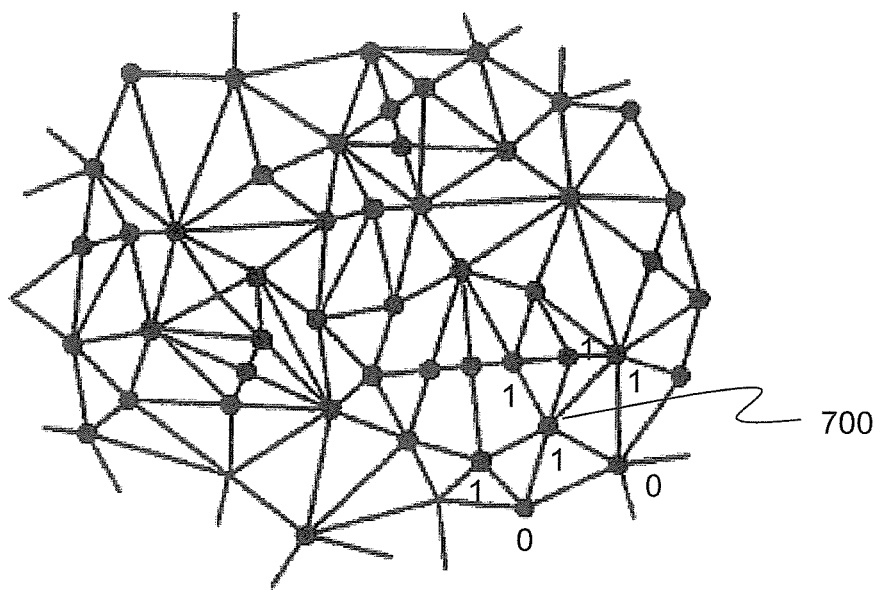
FIG. 7A illustrates an exemplary geometry mesh with vertices having masking values initially determined via the algorithm of FIG. 5 according to one embodiment of the invention.
Figure 7B:
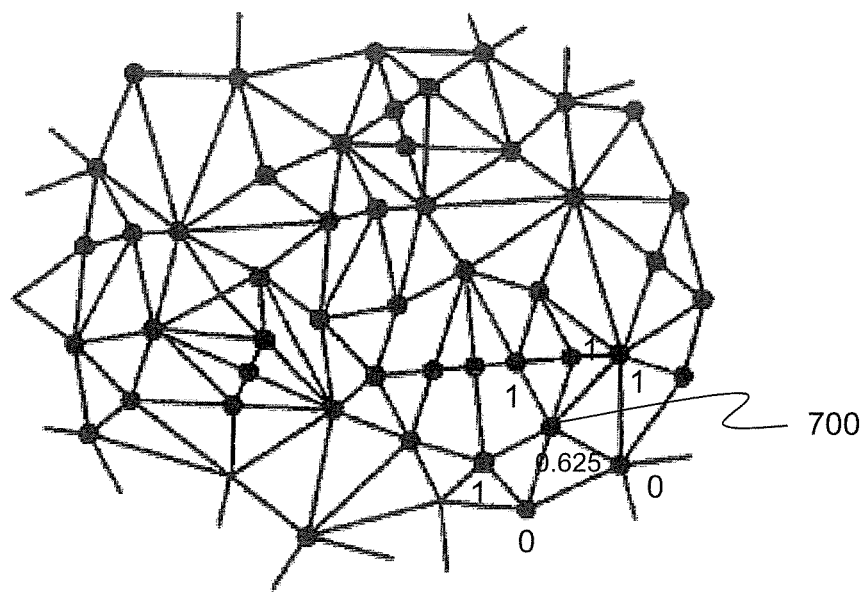
FIG. 7B illustrates an updated masking value for one of the vertices of FIG. 7A after an average computation based on its current masking value and the masking value of the vertices surrounding it according to one embodiment of the invention.

FIG. 7A illustrates an exemplary geometry mesh with vertices having masking values initially determined via the algorithm of FIG. 5 that indicate the vertices to be either masked or unmasked. According to this example, vertex 700 is initially assigned a masking value of 1 indicating that this vertex is fully masked. FIG. 7B illustrates the updated masking value of vertex 700 after an average computation based on its current masking value and the masking value of the vertices surrounding it. As illustrated in FIG. 7B, the updated masking value for vertex 700 is $\frac{5}{8}$=0.625. According to one embodiment of the invention, average values may be computed for all the vertices on the mesh and repeated a predetermined number of times, such as, for example, 20 times.

According to one embodiment of the invention, the vertices having averaged masking values ranging from 0 and 1 are rendered with a blurred appearance on the display. In this regard, a vertex having a masking value of 1 is rendered with a maximum darkened color, while a vertex having an average masking value less than 1 is rendered with a darkened color that is proportional to the averaged masking value. The blurred appearance is depicted for example, on the arm 201 in FIG. 4A as blurred section 220. According to one embodiment of the invention, the computer artist may manipulate the user input device by, for example, ALT-clicking or CTRL-clicking on the mesh to quickly decrease or increase the blurring of the mask boundary.

According to one embodiment of the invention, the masking value assigned to a vertex is used in computing a weight that is used by the posing module 14 to scale movement of the vertex when a particular reshaping action is applied. According to one embodiment of the invention, the weight is (1−w) where w is in the range [0.1] (i.e. from 0 and 1 inclusive, where w is a real number) and is the final mask value of each vertex of the geometry mesh. For example, a "move" reshaping tool translates all vertices (x,y,z) by (1−w)*S*(dx,dy,dz) where dx, dy and dz are the differences between an initial click position on the action line and a final dragged position, and S is a factor used to scale to model coordinates as will be understood by a person of skill in the art. Thus, when the mask value for a vertex is 1 indicating that the vertex is fully masked, the vertex is not affected by a reshaping action. However, when the mask value for a vertex is 0 indicating that the vertex is unmasked, full movement of the vertex is allowed based on the reshaping action. The fast or drastic transition in movement between a masked vertex and an unmasked vertex may be avoided via the vertices in the boundary between the fully masked vertices and the fully unmasked vertices having the average masking values described above. Thus, averaging of the masking values allow smoother transitions at the boundary of the mask.

Figure 8A:
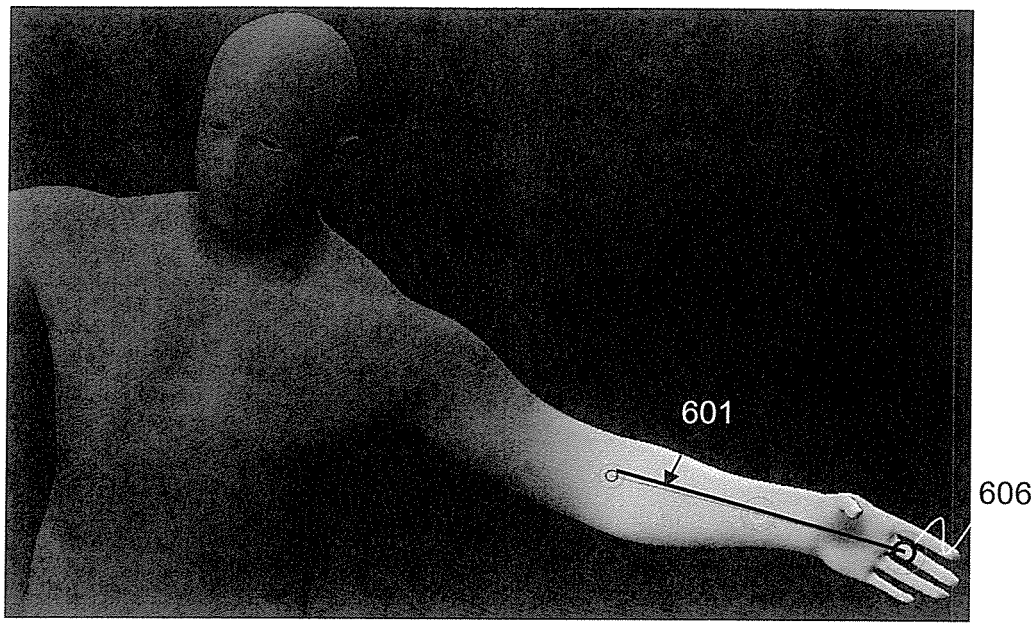
FIGS. 8A-8D are photographic images depicting the use of "scale" and "move" reshaping tools to quickly stunt the aim of a human model according to one embodiment of the invention.
Figure 8B:
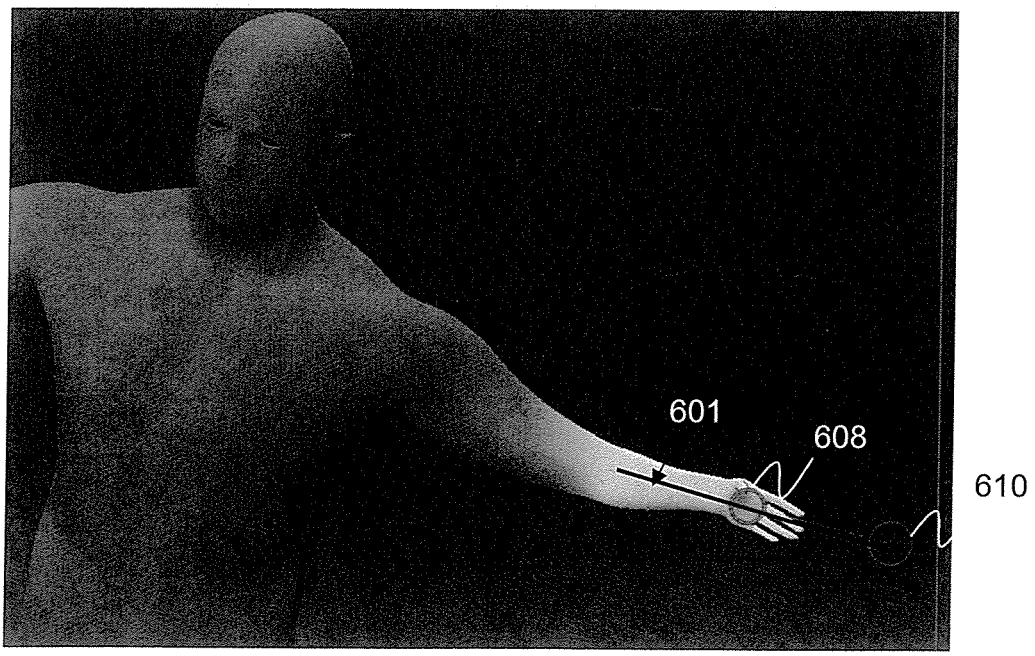

The quick and efficient posing of 3D objects will be appreciated via the following examples of uses of the different reshaping tools provided by the posing module. FIGS. 8A-8D illustrate the use of "scale" and "move" reshaping tools to quickly stunt the arm of a human model. The masking module 12 is initially invoked to mask all parts of the model except for the model's left arm as described above. The posing module 14 detects selection of the "scale" reshaping tool and draws an action line 601 in response to user manipulation of the user input device which clicks on an initial position and drags the user input device to a final position. The posing module 14 then detects that the user has clicked on circle 606 on the action line, and further detects dragging of the user input device in the direction of the elbow along the action line, causing the unmasked parts of the arm to scale down as uniformly as shown in FIG. 8B. Notice that the arm is shorter since the fingers are now between center circle 608 and rightmost circle 610 of the action line.

Figure 8C:
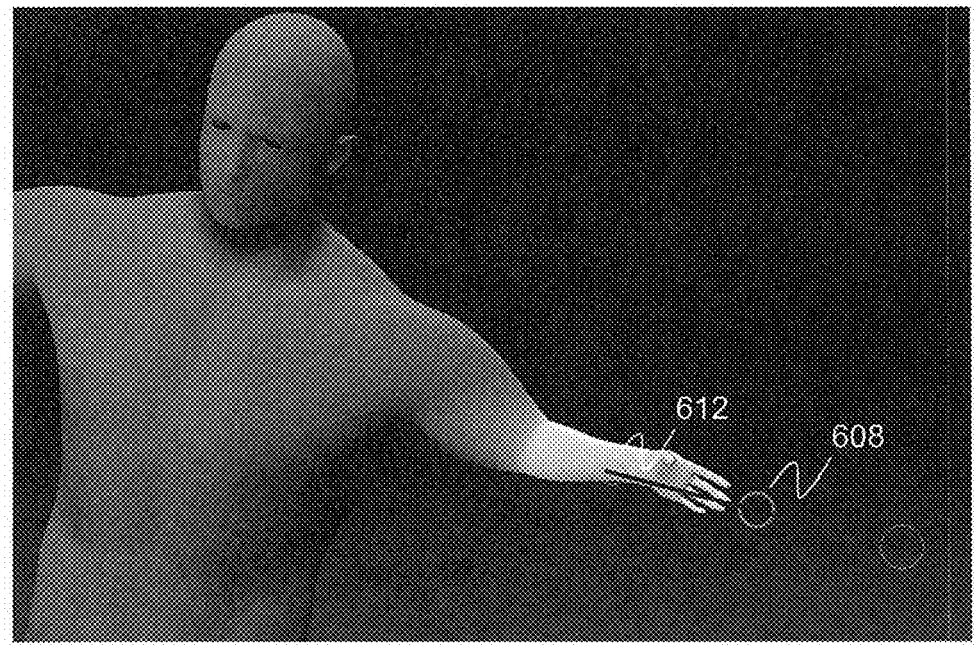
Figure 8D:
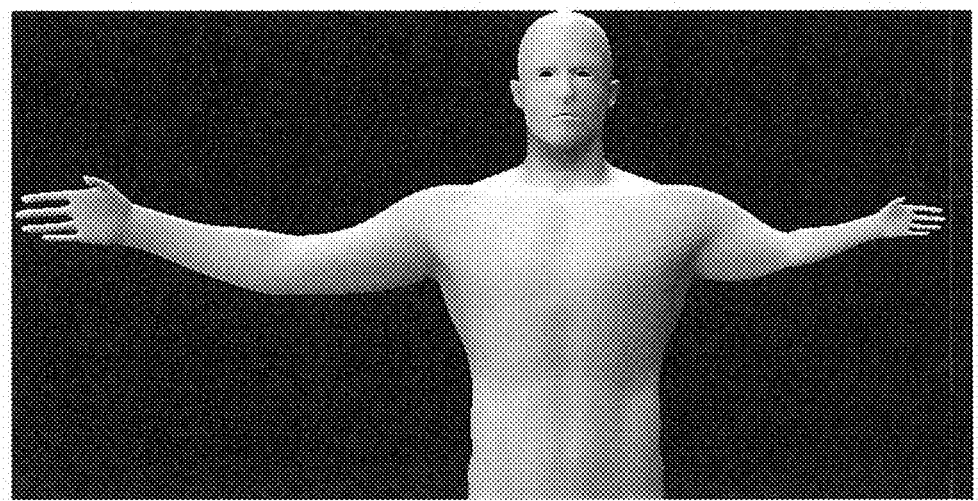

The posing module 14 next detects that the user has switched to the "move" reshaping tool. According to this example, the same action line 601 is used as the axis for the move action. The posing module 14 detects that the user has clicked on the center circle 608 of the action line and dragged it towards the elbow of the geometry mesh. In response, the posing module moves the unmasked parts of the arm towards the elbow as shown in FIG. 8C. Notice that the fingers are now between the leftmost circle 612 and center circle 608 of the action line. According to one embodiment of the invention, the "move" reshaping tool translates all vertices (x,y,z) by a (1−w)*S*(dx,dy,dz) where dx, dy and dz are the differences between the initial click position on the center circle 608 and the final mouse position after the artist drags the user input device towards the elbow and releases it. S is a factor used to scale to model coordinates as will be understood by a person of skill in the art, and w is the mask value on the vertex. The final effect of stunting the arm of the geometry mesh is depicted in FIG. 8D.

It can be appreciated that each of these operations can be done quickly and interactively, allowing the user to easily achieve dramatic changes to the pose or shape of the initial geometry mesh.

Figure 9A:
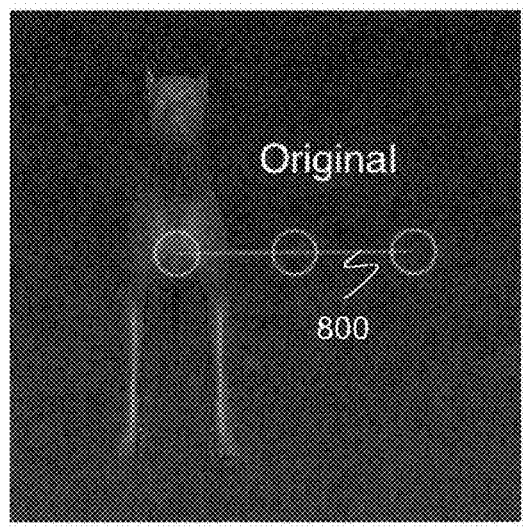
FIGS. 9A-9C are photographic images depicting the use of a "rotate" reshaping tool according to one embodiment of the invention.
Figure 9B:
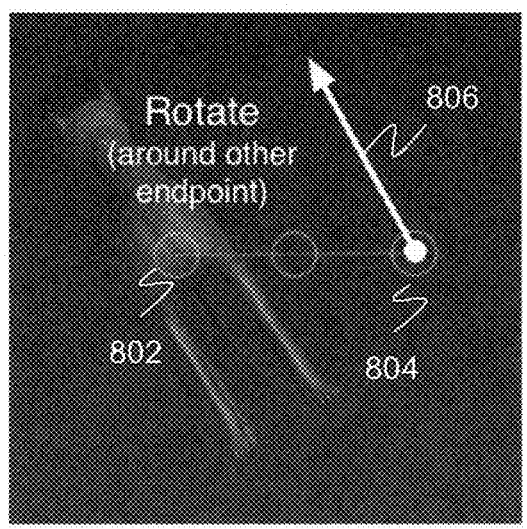
Figure 9C:
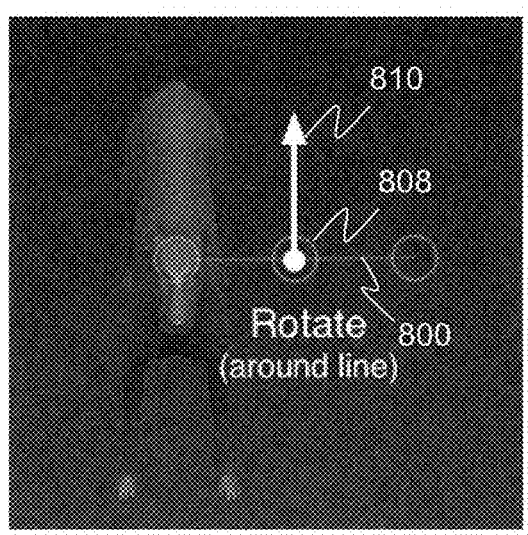

FIGS. 9A-9C provide an example of applying a rotation action in response to selection of the "rotate" reshaping tool according to one embodiment of the invention. FIG. 9A illustrates the original 3D model with an action line 800 drawn by the artist to define a coordinate system. FIG. 9B illustrates the 3D model rotated about endpoint 802 in response to an opposite endpoint 804 being dragged in direction 806. The rendering of the model is constantly updated to show the current rotated position based on the dragging of the endpoint 804. FIG. 9C illustrates the 3D model rotated about the action line 800 in response to midpoint 808 being dragged in direction 810. FIGS. 9A-9C illustrate posing of the 3D object without reshaping the geometry mesh.

Figure 10A:
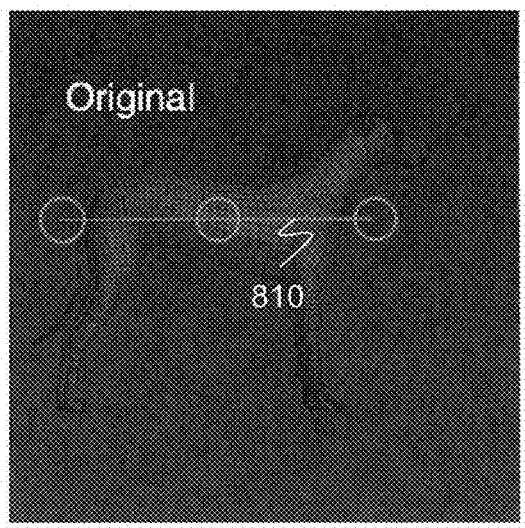
FIGS. 10A-10C are photographic images depicting the use of a "move" and "scale" reshaping tools according to one embodiment of the invention.
Figure 10B:
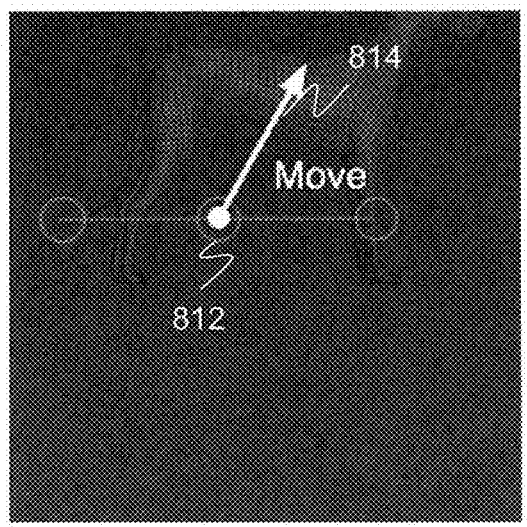
Figure 10C:
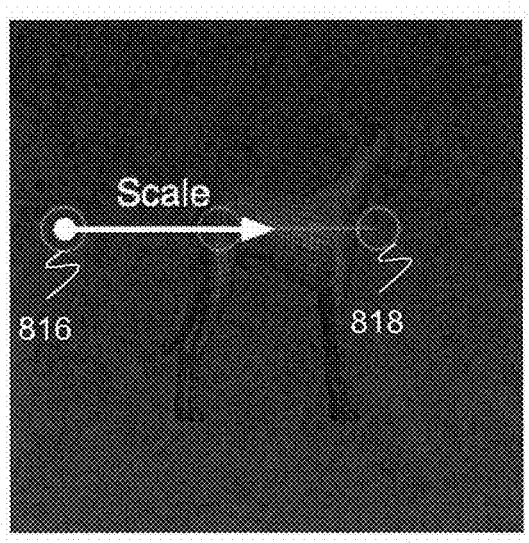

FIGS. 10A-10C provide examples of applying move and scaling actions in response to selection of the "move" and "scale" reshaping tools according to one embodiment of the invention. FIG. 10A illustrates the original 3D model with an action line 810 drawn by the artist to define a coordinate system. In order to move the entire model, the artist clicks and drags from inside a midpoint 812 in direction 814 as is illustrated in FIG. 10B. According to one embodiment of the invention, a Shift-drag constrains the move to be along the action line. FIGS. 10A-10B illustrate posing of the 3D object without reshaping the geometry mesh.

In order to scale or shear the original 3D model causing the model to be reshaped, the artist clicks and drags from inside an endpoint 816 of the action line as is depicted in FIG. 10C. The opposite end 818 takes the role of the origin of the coordinate system and the vertex underneath it does not move as the model is scaled. The vertex underneath the clicked point moves to follow the user input device, in the plane of the screen. All other vertices in the model are then moved proportionally within the coordinate system defined by the action line.

Figure 11A:
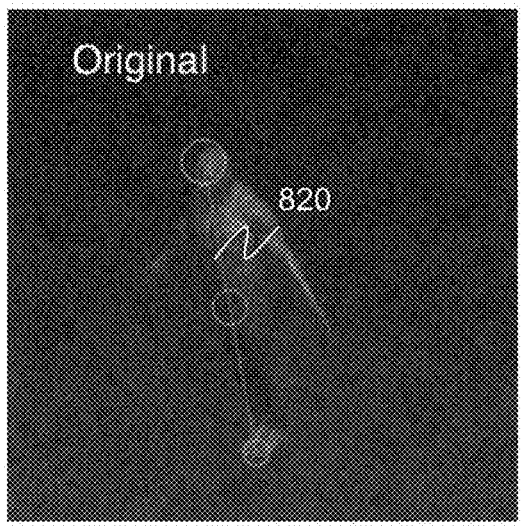
FIGS. 11A-11C are photographic images depicting the use of a "scale" reshaping tool according to one embodiment of the invention.
Figure 11B:
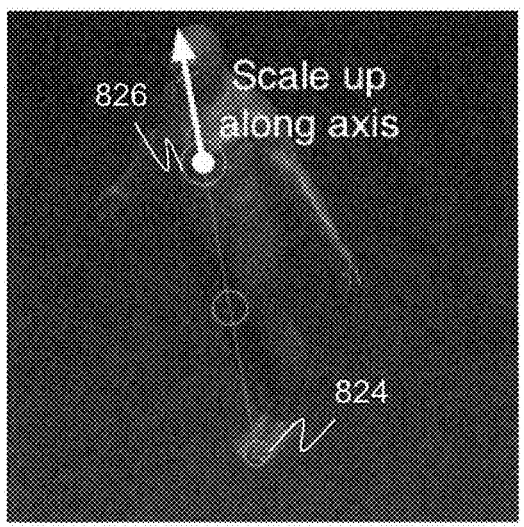
Figure 11C:
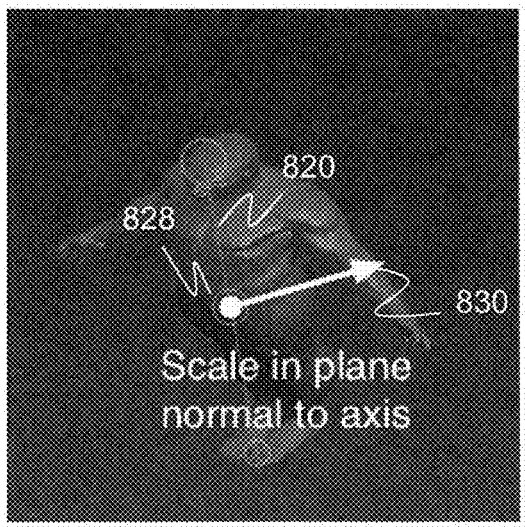

FIGS. 11A-11C provide other examples of applying a scaling action in response to selection of the "scale" reshaping tool according to one embodiment of the invention. FIG. 11A illustrates the original 3D model with an action line 820 drawn by the artist to define a coordinate system. In order to scale the object uniformly, the artist clicks and drags the center of an endpoint 826 away from an opposite endpoint 824 to scale the model up (FIG. 11B), and towards the other endpoint to scale the model down. The non-dragged endpoint serves as the origin of the scale. Hence, the vertex under that end does not move as the model is scaled.

In order to scale the model in the plane perpendicular to the action line 820, the artist clicks and drags from the inside of midpoint 828 in direction 830 to thicken the model as depicted in FIG. 11C. Dragging the user input device in the opposite direction results in thinning of the model.

According to one embodiment of the invention, holding down an ALT key when scaling allows the artist to achieve special types of scaling. For example, when dragging from an endpoint with the ALT key pressed, the model is scaled along the axis of the action line, but those parts of the model nearer to the dragged endpoint are affected much more strongly. For example, ALT dragging endpoint 824 allows the artist to lengthen the legs while leaving the rest of the model largely unchanged. ALT dragging from midpoint 828 causes the model to be scaled along all three axes, but the effect is much greater between the midpoint and the most recently used endpoint. For example, if the artist clicks on the head endpoint and then ALT drags from the midpoint, the result in the scaling of the torso and head to produce to more "hulking" model.

A person of skill in the art will appreciate that each reshape tool provides a different functionality to the user for quickly posing or reshaping a geometry mesh to achieve a dramatic pose or desired shape. For each reshape tool, the end or middle points of the corresponding action line define an axis or direction about which transform operations may be applied to the vertices of the geometry mesh.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A computer-implemented method for interactively modifying a 3D object modeled by a geometry mesh, the method comprising:
   displaying the 3D object on a display;
   electronically receiving a user selection of a reshaping action to be applied to the 3D object;
   receiving user input to mask a first region of the displayed 3D object that is not to be affected by the received selected reshaping action, wherein a second region of the displayed 3D object is left as unmasked;
   drawing an action line on a portion of the unmasked region of the displayed 3D object where a re-shaping action is to be applied to the 3D object, in response to a user command specifying a start point and an end point, wherein the action line defines an arbitrary axis relative to which a reshaping action is to applied and wherein the action line is placed on the unmasked region of the portion of the displayed 3D object;
   electronically receiving a user selection of a selected point associated with the action line;
   electronically detecting movement of a user input device with respect to the selected point; and
   electronically applying the selected reshaping action on at least a portion of the unmasked region of the 3D object based on the detected movement of the user input device and with reference to the action line, wherein the re-shaping action does not require generation of a virtual skeleton of the displayed 3D object.

2. A computer-implemented method for interactively modifying a 3D object modeled by a geometry mesh, the method comprising:
   displaying the 3D object on a display;
   drawing an action line on a portion of the displayed 3D object where an action to be applied to the 3D object, in response to a user command specifying a start point and an end point, wherein the action line is placed on the portion of the displayed 3D object without binding the geometry mesh to a virtual skeleton;
   electronically receiving a user selection of an action to be applied to the 3D object;
   electronically receiving a user selection of a point associated with the action line;
   electronically detecting movement of a user input device with respect to the selected point; and
   electronically applying the selected action on at least a portion of the 3D object based on the detected movement of the user input device and with reference to the action line, wherein the 3D object is associated with said geometric mesh formed via a plurality of polygons having edges and associated plurality of vertices, and the masking includes:
   electronically identifying a first vertex on the geometric mesh;
   electronically identifying a second vertex on the geometric mesh;
   for each current vertex of the plurality of vertices, electronically determining a first topological distance in a first path from the current vertex to the first vertex, and a second topological distance in a second path from the current vertex to the second vertex;
   electronically comparing the first topological distance with the second topological distance; and
   electronically masking at least the first portion of the 3D object and leaving at least the second portion of the 3D object unmasked based on the comparison.

3. The method of claim 1, wherein the selected reshaping action is a rotate action, the selected point is the end point, and the applying the selected reshaping action is rotating at least the portion of the 3D object about the start point.

4. The method of claim 1, wherein the selected reshaping action is a rotate action, and the applying the selected reshaping action is rotating the 3D object about an axis defined by the action line.

5. The method of claim 1, wherein the selected reshaping action is a scaling action, the selected point is the start point, the movement of the user input device is dragging the user input device away from the end point, and the applying the selected reshaping action is scaling up of at least the portion of the 3D object.

6. The method of claim 1, wherein the selected reshaping action is a scaling action, the selected point is the start point, the movement of the user input device is dragging the user input device towards the end point, and the applying the selected reshaping action is scaling down at least the portion of the 3D object.

7. The method of claim 1, wherein the selected reshaping action is a move action, and the applying the selected reshaping action is moving at least the portion of the 3D object about an axis defined by the action line.

8. A non-transitory computer readable media embodying program instructions for execution by a processing device, the program instructions adapting the processing device for interactively modifying a 3D object, the program instructions comprising:

displaying the 3D object on a display;

receiving a user selection of a reshaping action to be applied to the 3D object;

receiving user input to mask a first region of the displayed 3D object that is not to be affected by the received selected reshaping action, wherein a second region of the displayed 3D object is left as unmasked;

drawing an action line on a portion of the unmasked region of the displayed 3D object where a re-shaping action to be applied to the 3D object, in response to a user command specifying a start point and an end point, wherein the action line defines an arbitrary axis relative to which a reshaping action is to applied and wherein the action line is placed on the portion of the unmasked region of the displayed 3D object without binding the geometry mesh to a virtual skeleton;

receiving a user selection of an action to be applied to the 3D object;

receiving a user selection of a point associated with the action line;

detecting movement of a user input device with respect to the selected point; and applying the selected reshaping action on at least a portion of the unmasked region of the 3D object based on the detected movement of the user input device and with reference to the action line, wherein the re-shaping action does not require generation of a virtual skeleton of the displayed 3D object.

\* \* \* \* \*

UNITED STATES PATENT AND TRADEMARK OFFICE
CERTIFICATE OF CORRECTION

PATENT NO.      : 9,460,556 B2
APPLICATION NO. : 13/935429
DATED           : October 4, 2016
INVENTOR(S)     : Ofer Alon It is certified that error appears in the above-identified patent and that said Letters Patent is hereby corrected as shown below:

In the Claims

| Column 11, Line 64, Claim 1 | Delete "action to be", Insert --action is to be-- |
| Column 11, Line 67, Claim 1 | Delete "is to applied", Insert --is to be applied-- |
| Column 12, Line 18, Claim 2 | Delete "action to be", Insert --action is to be-- |
| Column 14, Line 1, Claim 8 | Delete "action to be", Insert --action is to be-- |
| Column 14, Line 4, Claim 8 | Delete "is to applied", Insert --is to be applied-- |

Signed and Sealed this
Twenty-sixth Day of December, 2017

Joseph Matal
*Performing the Functions and Duties of the
Under Secretary of Commerce for Intellectual Property and
Director of the United States Patent and Trademark Office*